United States Patent

[11] 3,629,554

[72] Inventor John L. Stewart
Apollo, Pa.
[21] Appl. No. 68,989
[22] Filed Sept. 2, 1970
[45] Patented Dec. 21, 1971
[73] Assignee PPG Industries, Inc.
Pittsburgh, Pa.
Continuation-in-part of application Ser. No. 785,515, Dec. 20, 1968, now abandoned. This application Sept. 2, 1970, Ser. No. 68,989

[54] ELECTRICALLY HEATED MULTIPLE GLAZED UNIT
5 Claims, 1 Drawing Fig.
[52] U.S. Cl. .................................................. 219/522,
219/509, 219/543
[51] Int. Cl. ....................................................... H05b 3/06,
H05b 3/04
[50] Field of Search .......................................... 219/203,
213, 509, 522, 543, 544; 338/308–309; 244/134

[56] References Cited
UNITED STATES PATENTS
2,557,905 6/1951 Burton et al. ................. 219/213
2,648,754 8/1953 Lytle ............................. 219/543 X
2,991,207 7/1961 Miller ........................... 219/203
3,263,063 7/1966 Marriott et al. ................ 219/522
3,467,818 9/1969 Ballentine ..................... 219/522

Primary Examiner—Volodymyr Y. Mayewsky
Attorney—Chisholm and Spencer

ABSTRACT: An electroconductive multiple glazed unit comprising a plurality of transparent glass panels spaced from one another and sealed around their edges to unite said panels into a substantially rigid structure and provide a hermetically sealed space therebetween. A transparent electroconductive coating on the inner surface of at least one of said glass panels and bus bars bonded to said inner surface of said one of said glass panels and in electrical contact with said electroconductive coating. The bus bars and the electroconductive coating each being composed of material that will break into small particles with breakage of adjacent portions of the coated glass panel and said coated glass panels having a tensile strain in the area occupied by said bus bars in excess of about 2,000 millimicrons per inch.

PATENTED DEC 21 1971
3,629,554
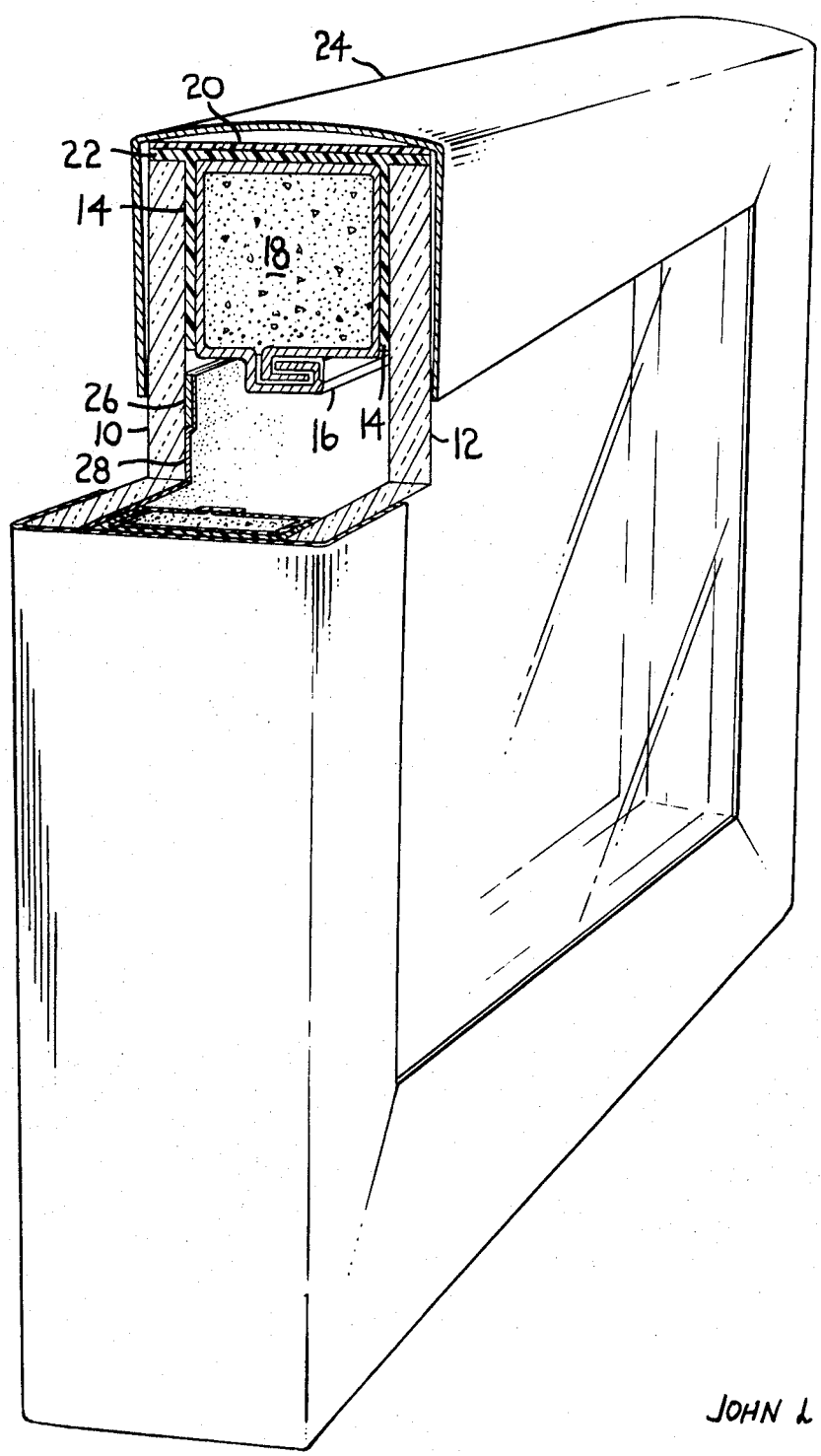
INVENTOR
JOHN L. STEWART
BY Chisholm and Spencer
ATTORNEYS

ELECTRICALLY HEATED MULTIPLE GLAZED UNIT

CROSS-REFERENCE TO RELATED APPLICATIONS

This application is a continuation-in-part of copending application Ser. No. 785,515, filed Dec. 20, 1968, now abandoned, by John L. Stewart for Electrically Heated Multiple Glazed Unit.

BACKGROUND OF THE INVENTION

This invention relates to an electrically heated multiple glazed unit and, more particularly, to a multiple glazed unit having an electroconductive film and bus bars on the inner surface of one of its glass sheets. In accordance with the present invention, the glass sheet carrying the bus bars is tempered to provide a tensile strain in the area occupied by said bus bars in excess of about 2,000 millimicrons per inch. If the electroconductive sheet of the unit is broken, the tensile stress in the glass sheet is released and completely destroys the bus bars, thus rendering the unit safe against accidental electrical shock hazards.

The foregoing and other objects, features and advantages of this invention will become more apparent from the description that follows, when taken in conjunction with the drawing, which is a perspective view, partly in section, of a multiple glazed unit embodying the principles of this invention.

Multiple glazed units within the contemplation of this invention generally comprise two or more sheets of glass spaced from one another to provide an insulating space between the sheets. This space, which generally contains air or other insulating gas, such as difluorodichloromethane gas, carbon dioxide gas, etc., is effective for reducing the passage of heat through the unit due to convection and conduction. In one typical type of multiple glazed unit, the sheets of glass are spaced from each other by a marginal edge spacer element extending around the periphery of the glass sheets. In this type of unit, the sheets of glass are generally adhered to the spacer element by a mastic composition forming a continuous film around the edges of the sheets, between each sheet and the spacer element, to provide a primary hermetic seal.

The spacer element of the above-mentioned unit is generally tubular in shape and filled with a desiccant. Openings in the spacer element communicate with the enclosed space of the unit and the inside tubular portion of the element so that moisture from the air or gas within the space will be absorbed by the desiccant. A resilient, moisture-resistant strip with a layer of mastic adhered thereto is preferably placed around the peripheral edges of the glass sheets and the spacer element to provide a secondary hermetic seal. A channel of substantially U-shaped cross section is also preferably affixed around the periphery of the unit to protect the peripheral edges of the glass sheets forming the unit. The above type of multiple glazed unit construction is fully disclosed in U.S. Pat. No. 2,838,810, assigned to the assignee of the present invention.

In connection with the present invention, a multiple glazed unit, such as a unit of the type described above, is provided with a transparent electroconductive coating or film on the inner surface of one of its glass sheets. A pair of bus bars are also affixed to the glass sheet on opposite marginal edge portions thereof and in electrical contact with the transparent electroconductive film. The bus bars are provided to conduct current from an outside source to the film and thereby heat the film and its adjacent glass sheet substrate. One preferred method of accomplishing the above, in which a transparent electroconductive metal oxide film and a pair of bus bars are provided on a glass sheet, is fully disclosed in U.S. Pat. No. 2,648,754, assigned to the assignee of the present invention.

In accordance with the present invention, it has been found desirable to temper the electrically heated glass sheet, in a unit such as described above, so that this glass sheet has a tensile strain in the area occupied by the bus bars in excess of about 2,000 millimicrons per inch. The reason for this is that these units are frequently used to fenestrate areas occupied by people, to provide, for example, an insulating window that is heated to avoid discomfort due to air drafts. However, as will be apparent, glass fenestrations are subject to being broken, and a glass fenestration containing an electrical circuit can, if broken, potentially be the source of a serious electrical shock hazard to individuals who could then come into physical contact with the electrical circuit. Many electrically responsive relay devices or the like can be devised in order to minimize this electrical shock hazard, but, in accordance with the present invention, it has been found desirable to provide a protective means which would completely destroy the bus bars conducting current to the unit, and thus render the unit safe against electrical shock hazards. Accordingly, it has been discovered that by tempering the electrically heated glass sheet to provide a tensile strain in the area occupied by the bus bars above about 2,000 millimicrons per inch, the glass sheet, if broken, will release this tensile stress and will consistently destroy the bus bars conducting electrical current to the sheet.

The particular means used in conjunction with this invention for measuring stress involves placing the sheet of tempered glass between a polarized light source and a graduated quartz wedge. The quartz wedge is calibrated in millimicrons. The polarized light passes through the thickness dimension of the sheet to be measured and the quartz wedge. A trained observer viewing directly into the quartz wedge will see a distinctive band which delineates and defines the maximum deviation of polarized light caused by the particular type of stress being observed. The graduations on the quartz wedge permit a direct reading of the magnitude of the strain in millimicrons per glass thickness, or the maximum deviation of a beam of polarized light from the path it would take through the thickness of the glass if the glass were unstressed.

The locality within the glass sheet which is to be measured is either selected or it is possible to locate the point of maximum stress by scanning the surface area of the glass sheet. The strain corresponding to the stress at the selected locality is then measured by looking through the quartz wedge, directly into that locality. For example, the tensile stress of the peripheral margin of a tempered glass sheet is measured a slight distance inwardly from the edges of the sheet, i.e., the tensile stress zone. Similarly, the compressive stress of the peripheral margin of this sheet is measured by looking at the surface of the sheet, directly at its edges, i.e., the compressive stress zone.

The graduations on the quartz wedge give the measured strain value in units of millimicrons per glass thickness. The measured strain value, adjusted to millimicrons per inch, may be converted to pounds per square inch stress units by multiplying by a stress factor. The stress factor will vary for different glass compositions. For commercial plate glass, the stress factor is 2.13 pounds per square inch for each millimicron of strain per inch of glass thickness.

The conversion formula is:

$$S = K \times R / b$$

where $S$ is the stress in pounds per square inch; $K$ is the stress factor for converting strain units, expressed as millimicrons per inch, into stress units expressed as pounds per square inch; $R$ is the optical retardation in millimicrons; and $b$ is the glass thickness in inches.

In carrying forward the present invention, breakage tests were made to determine the "fail-safe" capability and breakage patterns of electrically heated multiple glazed units constructed generally in accordance with the aforesaid U.S. Pat. No. 2,838,810, and U.S. Pat. No. 2,648,754, and embodying the principles of this invention. The drawing shows the construction of the units used in these tests. As shown, these units were comprised of two glass panels 10 and 12 adhered by mastic 14 to a metal marginal edge spacer element 16 that contained a desiccant 18. The peripheral edges of the glass panels and the spacer element were covered with a resilient, moisture-resistant strip 20 having a layer of mastic 22 adhered thereto. A metal U-shaped channel 24 was affixed around the periphery of the unit. The inner surface of panel 10 had a pair of vitreous metallic bus bars 26 (one of which is shown) affixed to opposite marginal edge portions of the panel, and a transparent electroconductive metal oxide film 28 covered this surface and the bus bars to within about one-fourth inch of the metal spacer element 16.

For the breakage tests, eight 3-foot by 4-foot double glazed units of the above construction were used. Four units consisted of tempered 3/16-inch glass and four of tempered ¼-inch glass panels. The degree of temper of the glass panels varied from panels having a center tension strain at the edge of the sheet, i.e., in the area occupied by the bus bars, of 1,550 millimicrons per inch to panels having an edge center tension strain of greater than 2,200 millimicrons per inch. The following table shows the results of these tests:

TABLE 1

| Sample No. | Glass thickness (inches) | Center tension strain (mu/inch) Center of panel | Center tension strain (mu/inch) Edge of panel | Breaking method and location | Breakage force (ft.-lb.) | Result |
| --- | --- | --- | --- | --- | --- | --- |
| 1 | 3/16 | 1,340 | 1,700 | 2″ steel ball at center of unit | 3.5 | Bus bar severed at a few points by running vents. |
| 2 | 3/16 | 1,430 | 1,810 | Center punch and hammer at three corners | | Do. |
| 3 | 3/16 | 1,450 | 1,550 | 2″ steel ball at center edge of unit | 3.0 | Do. |
| 4 | 3/16 | 1,560 | 1,710 | 2″ steel ball at corner of unit | 3.5 | Do. |
| 5 | ¼ | 2,200 | >2,200 | 2″ steel ball at center of unit | 7.5 | Bus bar completely destroyed by glass shattering into small particles. |
| 6 | ¼ | 1,910 | 2,000 | Center punch at corner of unit | | Do. |
| 7 | ¼ | 1,800 | >1,800 | 2″ steel ball at center edge of unit | 3.0 | Do. |
| 8 | ¼ | 2,150 | >2,150 | 11 lb. shot bag at center of unit | 88 | Do. |

It will be apparent from the results of the foregoing tests that, in accordance with the present invention, electrically heated multiple glazed units can be made safe against electrical shock hazards. In particular, the above tests show that by tempering the glass sheet carrying the bus bars to provide a tensile strain in the area occupied by said bus bars in excess of about 2,000 millimicrons per inch, the electroconductive glass sheet, if broken, will release the tensile stress and completely destroy the bus bars. Since the bus bars are provided to conduct electrical current from an outside power source to the electroconductive glass sheet, the complete destruction of the bus bars precludes current from being conducted to the electroconductive film carried on this glass sheet. Accordingly, should portions of the electroconductive film and its glass substrate remain intact in the unit after the multiple glazed unit is broken, individuals coming into physical contact with the film will experience no danger of receiving an electrical shock therefrom.

From the above description of a specific embodiment of the present invention, it will be readily apparent to those skilled in the art that various modifications may be made without departing from the spirit of the invention. For example, various materials, arrangements of parts and components within the range of equivalents other than those specifically mentioned may be employed in the practice of the present invention. In this connection, it should be obvious that more than one glass sheet forming a part of a multiple glazed unit may be provided with an electroconductive film and bus bars and, accordingly, each such sheet can be similarly tempered in accordance with this invention. Also, it should be evident that any nonelectroconductive glass sheet, forming a part of a multiple glazed unit constructed in accordance with this invention, may either be tempered or may comprise a sheet of annealed glass. In addition, a satisfactory relay device or the like for terminating power to the electrically heated multiple glazed unit in this invention may also be provided to supplement the "fail-safe" characteristics of the unit imparted by the bus bars being completely destroyed if the unit is broken.

Accordingly, while the present invention has been described in detail with respect to the embodiment above, it is to be understood that such details are not to be limitations upon the scope of the invention except insofar as set forth in the accompanying claims.

I claim:

1. An electroconductive multiple glazed unit comprising a plurality of transparent glass panels spaced from one another and sealed around their edges to unite said panels into a substantially rigid structure and provide a hermetically sealed space therebetween, a transparent electroconductive coating on the inner surface of at least one of said glass panels and bus bars bonded to said inner surface of said one of said glass panels and in electrical contact with said electroconductive coating, said bus bars and said electroconductive coating each being composed of material that will break into small particles with breakage of adjacent portions of said one of said glass panels and said one of said glass panels having a tensile strain in the area occupied by said bus bars in excess of about 2,000 millimicrons per inch.

2. An electroconductive multiple glazed unit according to claim 1 wherein said electroconductive coating comprises a transparent metal oxide film.

3. An electroconductive multiple glazed unit according to claim 1 wherein said bus bars are comprised of a vitreous metallic composition.

4. An electroconductive multiple glazed unit according to claim 1 wherein said unit is comprised of at least a pair of glass panels, both of which are tempered glass.

5. An electroconductive multiple glazed unit according to claim 1 wherein said unit is comprised of at least a pair of glass panels, one of which is annealed glass.

* * * * *